United States Patent [19]

Arai

[11] Patent Number: 4,715,802
[45] Date of Patent: Dec. 29, 1987

[54] INJECTION MOLDING MACHINE
[75] Inventor: Takashi Arai, Tokyo, Japan
[73] Assignee: Canon Kabushiki Kaisha, Tokyo, Japan
[21] Appl. No.: 876,079
[22] Filed: Jun. 19, 1986
[30] Foreign Application Priority Data Jun. 27, 1985 [JP] Japan .................. 60-140742

[51] Int. Cl.$^4$ .............................................. B29C 45/16
[52] U.S. Cl. ..................... 425/130; 264/240; 264/241; 264/245; 264/255; 264/328.8; 264/328.13; 264/DIG. 57; 425/462; 425/573; 425/DIG. 229
[58] Field of Search ............... 264/240, 405, 241, 245, 264/328.8, 328.13, DIG. 57, 255; 425/130, 131.1, 462, 573, DIG. 229, 146, 132; 137/625.41, 602

[56] References Cited

U.S. PATENT DOCUMENTS

| | | | |
|---|---|---|---|
| 3,339,240 | 9/1967 | Corbett | 425/130 |
| 3,599,290 | 8/1971 | Garner | 264/255 |
| 3,690,797 | 9/1972 | Garner | 425/146 |
| 3,733,156 | 5/1973 | Garner | 425/132 |
| 3,801,684 | 4/1974 | Schrewe et al. | 264/40.7 |
| 3,809,519 | 5/1974 | Garner | 137/625.41 |
| 3,873,656 | 3/1975 | Garner | 264/55 |
| 3,979,170 | 9/1976 | Monnet | 425/130 |

FOREIGN PATENT DOCUMENTS

| | | | |
|---|---|---|---|
| 28464 | 9/1975 | Japan . | |
| 17548 | 2/1979 | Japan | 137/625.41 |
| 936641 | 9/1963 | United Kingdom . | |
| 1472075 | 4/1977 | United Kingdom . | |

Primary Examiner—Jay H. Woo
Assistant Examiner—Timothy W. Heitbrink
Attorney, Agent, or Firm—Fitzpatrick, Cella, Harper & Scinto

[57] ABSTRACT

In a molding machine wherein in molding a molded article, the molded article is molded into a so-called sandwich shape in which the central portion of the molded article is molded with core layer resin and the outer surface of the core layer is wrapped with skin layer resin, a valve for changing over and injecting the resins from a first injection cylinder for injecting the core layer resin and a second injection cylinder for injecting the skin layer resin is substantially cylindrical, a cut-away portion for changing over and distributing the resins is formed in the central portion of the valve, and sandwich molding is accomplished with the opening-closing of the cut-away portion and each passageway being effected by rotation of the valve.

2 Claims, 13 Drawing Figures

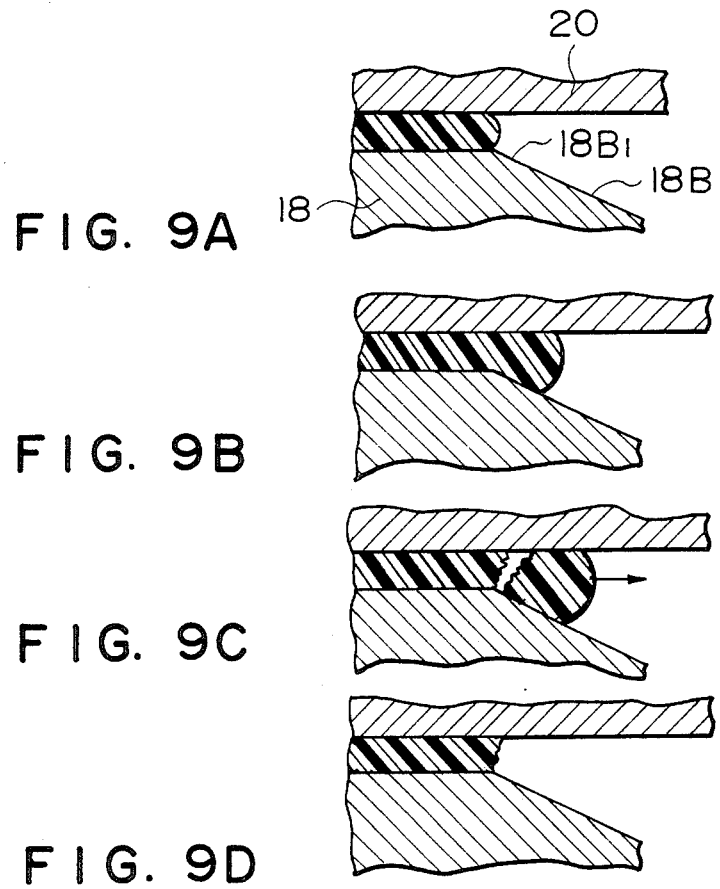
FIG. 9A
FIG. 9B
FIG. 9C
FIG. 9D
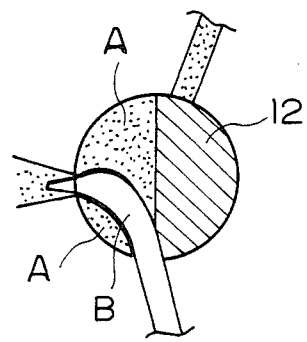
FIG. 10

INJECTION MOLDING MACHINE

BACKGROUND OF THE INVENTION

1. Field of the Invention

This invention relates to so-called sandwich molding in which two kinds of molten resin materials are poured into the molding space of a mold to thereby form a skin layer and a core layer, and in particular to a change-over mechanism and a change-over process whereby discrete resins are poured into the space through a space.

2. Related Background Art

The following conditions are required of a sandwich injection molding machine in which two kinds of resins are successively poured into the molding space of a mold to thereby form a molded article of skin layer resin and the circumference of the core layer can be covered with the skin layer.

(i) That the two kinds of resin materials do not mix together in the molding space during molding.

(ii) Due to the recent development of various business machines and OA (office automation) instruments, high-precision and high-strength plastics are used for the housings and parts of those instruments, and high-speed and high-pressure injection molding is carried out for the improvement of the functions of the parts and therefore, high internal pressure acts on a value mechanism for changing over the resin materials. Therefore, during the repetition of continuous molding, elastic and plastic deformation of the value mechanism occurs due to the repetition stress and comes to affect the accuracy of the molded article and the durability of the molding machine. Particularly, in the case of the sandwich molding, where, for example, a material of relatively low strength and good surface finish is used for the skin layer and a material of high strength (such as fiber-reinforced resin) is used for the core layer, the fluidity of the materials causes the materials to leak from a gap created in the valve mechanism, the leaking materials will damage the valve mechanism and this may adversely affect the molded article.

Therefore, a valve mechanism which will be capable of withstanding high-pressure injection molding is required and also, a mechanism for preventing the valve mechanism from being damaged by the leaking materials is required.

As a sandwich injection molding machine for overcoming the above-noted problems, there is known Japanese Patent Publication No. 28464/1975. A feature of the injection molding machine shown in this patent publication resides in a valve mechanism whereby resin materials from two injection cylinders are poured into a molding space in the mold through a pouring gate passageway, and a feature of this valve mechanism lies in its construction wherein a valve rotating in a predetermined position of the valve body is provided and the valve is provided with a first hole for pouring the resin from a first injection cylinder into said molding space and a second hole for pouring the resin from a second injection cylinder into the same molding space and the valve is rotated so as to open and close the passageways of the first and second holes.

According to the technique of the above-mentioned patent publication, of the above-described conditions required of the sandwich molding, the problem of preventing the resin materials from mixing together can be solved, but the deformation of the valve mechanism caused by the high-pressure injection molding and the problem caused by the leaking resin have not yet been solved.

Also, the construction of the valve of the above-mentioned patent publication is such that discrete holes for resins are provided individually and therefore, alignment between each injection cylinder and the inlet of each hole and alignment between the pouring gate and the outlet of each hole is required, and this leads to a problem such as complicated structure of the valve.

SUMMARY OF THE INVENTION

It is an object of the present invention to provide a sandwich injection molding machine provided with a valve mechanism which satisfies the above-mentioned conditions required of the sandwich injection molding machine, and particularly to provide a sandwich injection molding machine suited for the production of parts of which mass production is required, such as the parts of optical instruments and business instruments.

It is a further object of the present invention to provide a sandwich molding machine provided with a valve mechanism having the function of preventing the damage of the valve mechanism which would otherwise be imparted by molten resin materials leaking into the valve mechanism as mentioned in (ii) above.

BRIEF DESCRIPTION OF THE DRAWINGS

FIGS. 9A, 9B, 9C and 9D illustrate the discharge of leaking resin by the construction of FIG. 8.

FIG. 10 illustrates the step of pouring the core layer resin.

DESCRIPTION OF THE PREFERRED EMBODIMENT

Figure 1:
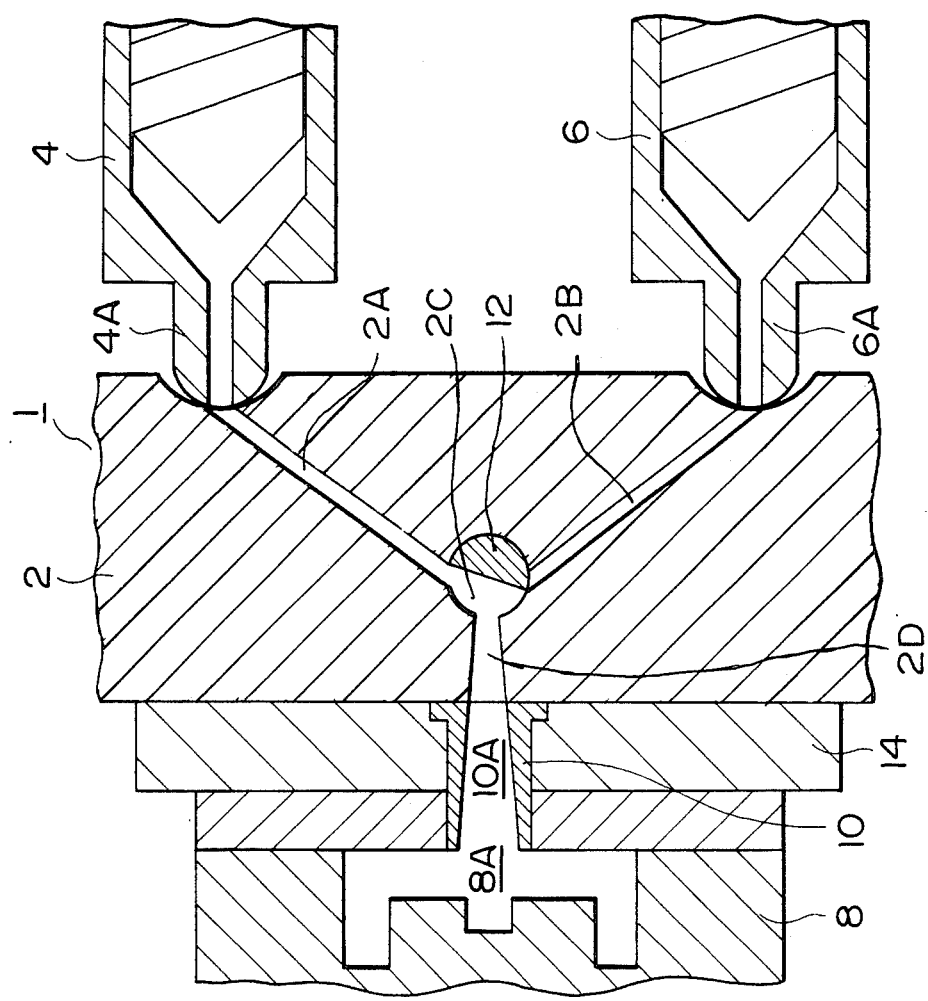
FIG. 1 is a cross-sectional view showing the construction of a molding machine according to the present invention.

An embodiment of the present invention will hereinafter be described with reference to FIG. 1 to 10. FIG. 1 shows a cross-sectional view of the essential portions of a sandwich molding machine including a valve mechanism according to the present invention. In FIG. 1, reference numeral 1 generally designates the molding machine which comprises a valve holding member 2 having a passageway 2a for a first resin material and a passageway 2B for a second resin material, first and second injection cylinder units 4 and 6, a mold 8 having a molding space 8A, and sprue bush 10.

The valve holding member 2 is provided with a hole 2C into which a valve 12 is fitted, and the hole 2C is connected to said passageways 2A and 2B.

The entrance sides of the passageways 2A and 2B of the valve holding member 2 are connected to the inlets of the injection cylinder portions 4A and 6A of said injection cylinders 4 and 6, respectively.

Reference numeral 14 denotes a bush holding member for holding the sprue bush 10, which is provided with a sprue 10A connecting the molding space 8A of the mold 8 to the sprue 2D of the valve holding member 2.

Figure 2:
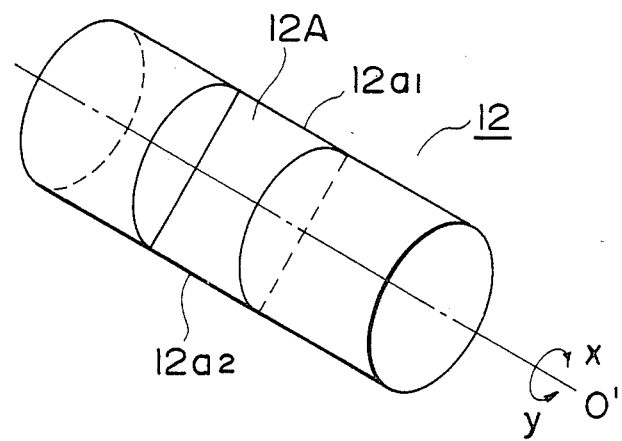
FIG. 2 is a perspective view of a valve used in FIG. 1.

The valve 12 fitted into the hole 2C of the valve holding member assumes a cylindrical shape as shown in FIG. 2 and is provided with a cut-away portion 12A provided by cutting away the axial central portion thereof into a substantially semicircular shape, and cutting edges $12a_1$ and $12a_2$ are provided on the cut-away ends of the cut-away portion 12A. The cross-section of the valve 12 shown in FIG. 1 is the cross-section of the central portion of the cut-away portion 12A of the valve 12. The valve 12 is designed to be reciprocally rotated indirections x and y about the axis O' by drive means such as an air pressure cylinder or a motor, not shown.

FIGS. 3 to 6 show the steps of sandwich molding by the apparatus of the present embodiment, and these steps will now be described with reference to these Figure. The state illustrated in the consturtion of the apparatus of FIG. 1 is a start state in which resin materials have not yet been poured in from the injection cylinders 4 and 6. In this start state, the cut-away portion 2C of the valve 12 is connected to the passageway 2A and the sprue 2D of the valve holding member, and the passageway 2B is closed by the cylindrical portion of the valve 12.

Figure 3:
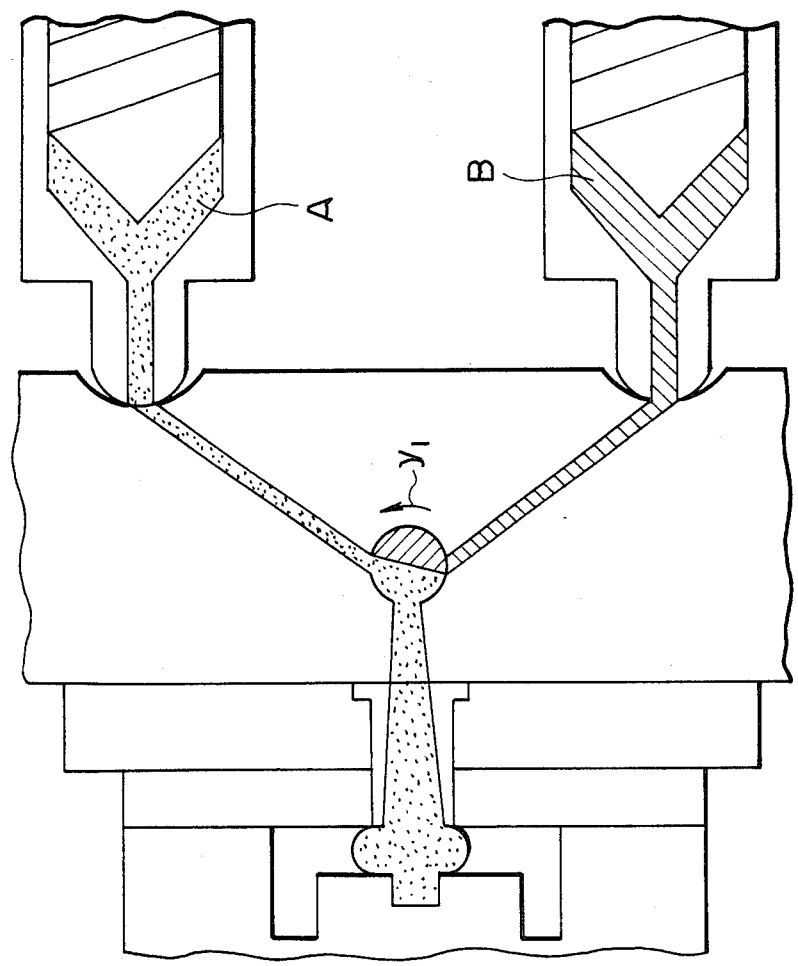
FIGS. 3 to 6 are illustrations of the sandwich molding process, FIG. 3 illustrating the step of pouring a skin layer A, FIG. 4 illustrating the step of pouring a core layer B, FIG. 5 illustrating the step of pouring the skin layer A into the cut-away portion of the valve, and FIG. 6 illustrating the step of closing the passageway of a valve holding member by the valve.
Figure 4:
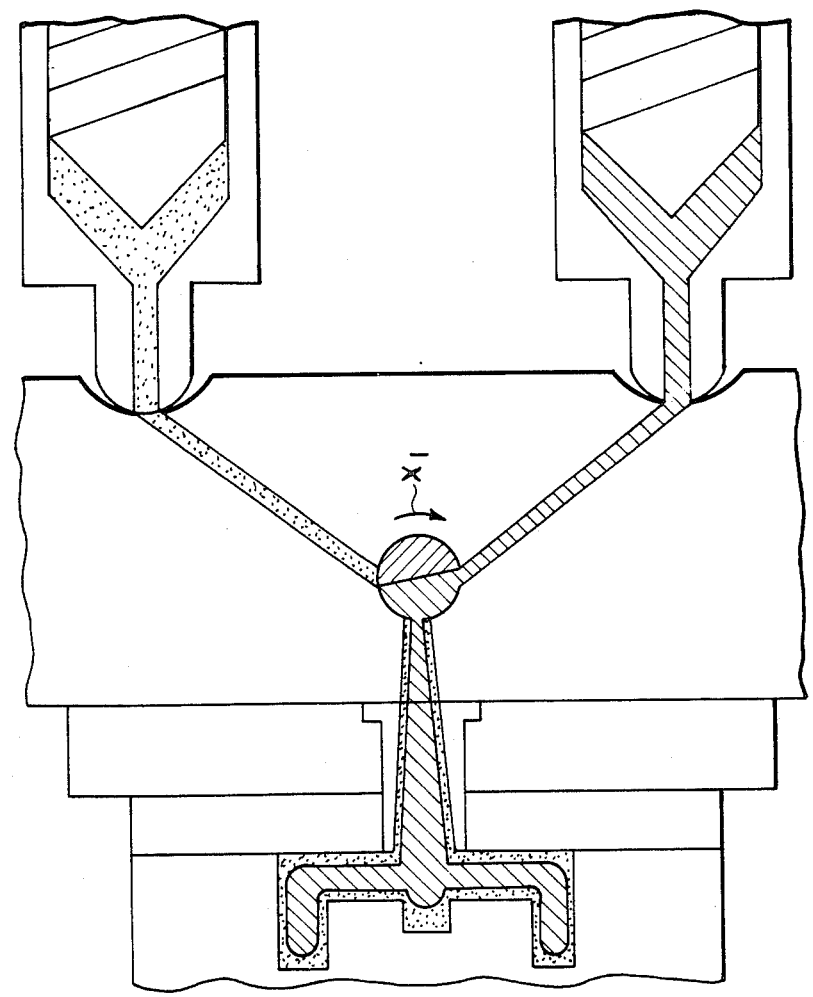

When from the start position of FIG. 1, molten resins A and B are poured into the passageways 2A and 2B, respectively, of the valve holding member by the first and second injection cylinder units 4 and 6 as shown in FIG. 3, the resin A from the first injection cylinder which forms the skin layer is poured into the molding space 8A of the mold through the passageway 2A, the cut-away portion 12A of the valve and the spures 2D and 10A. The resin B forming the core layer fills the passageway 2B, but the flow thereof into the sprue 2D is prevented by the valve 12. After the skin layer resin a has been poured into the mold by a predetermined a amount, the valve 12 is rotated in the direction of arrow $y_1$ by said drive means, not shown. FIG. 4 in which the valve 12 has been rotated by a predetermined angle in the direciton of arrow $y_1$ shows a state in which the core layer has been poured in. When the valve 12 is rotated in the direction of arrow $y_1$ from the state of FIG. 3 in which the skin layer has been poured in, the passageway 2A is closed by the cylindrical portion of the valve 12 and at the same time, the passageway 2B is connected to the cut-away portion 12A of the valve and the sprue 2D.

During the rotation of the valve 12, the skin layer resin A is cut by the cutting edges provided at the ends of the cut-away portion 12A of the valve.

Figure 5:
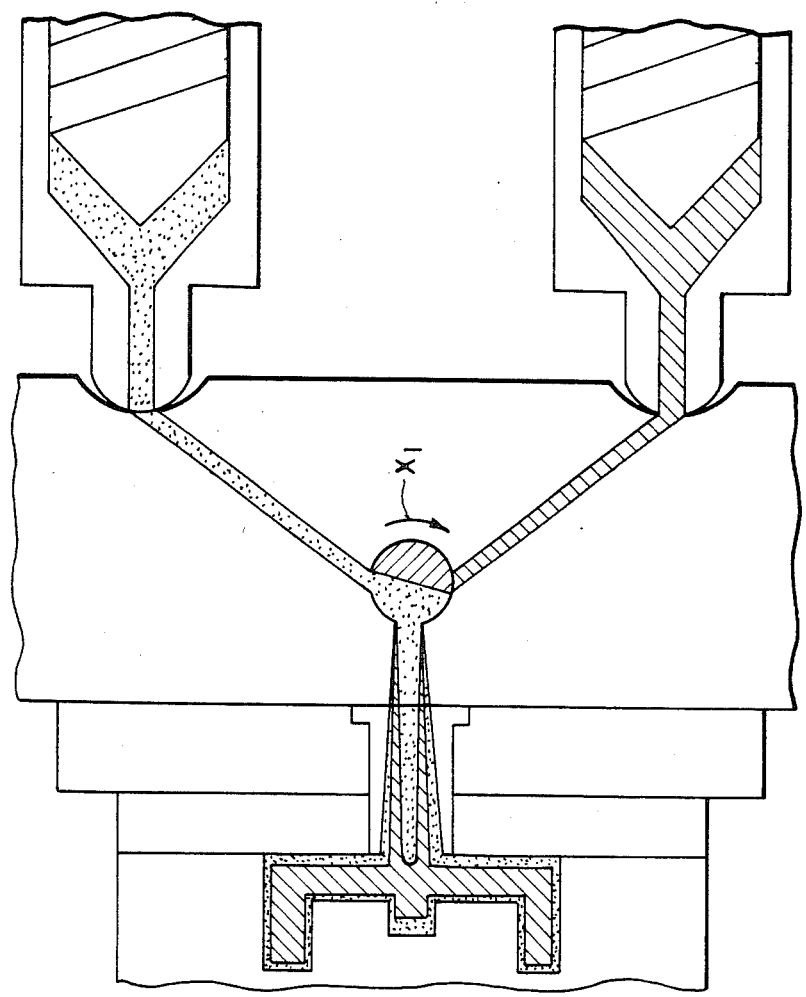

When the valve 12 is rotated as shown in FIG. 4, the core layer resin B is poured into the molding space of the mold through said connection passageway. The core layer resin B poured in fills the molding space of the mold while depressing the skin layer resin A toward the inner periphery of said space. When the core layer resin B has been poured in by a predetermined amount, the process shifts to the step of again pouring the skin layer resin A into the cut-away portion 12A of the valve as shown in FIG. 5. The valve 12, as shown in FIG. 5, rotates in the direciton of arrow $x_1$ from the position of FIG. 4 and, returns to a position in which it again opens the passageway 2A and the cutaway portion 12A and again closes the passageway 2B, and stops at that position. When the state of FIG. 5 is restored, the skin layer resin A is again poured into the sprues 2D and 10A through the cut-away portion 12A, and the amount of the skin layer resin A thus poured in is set to an amount filling the cut-away portion 12A of the valve with the skin layer resin A in order to force the core layer resin B in the sprues 2D and 10A into the mold.

Figure 6:
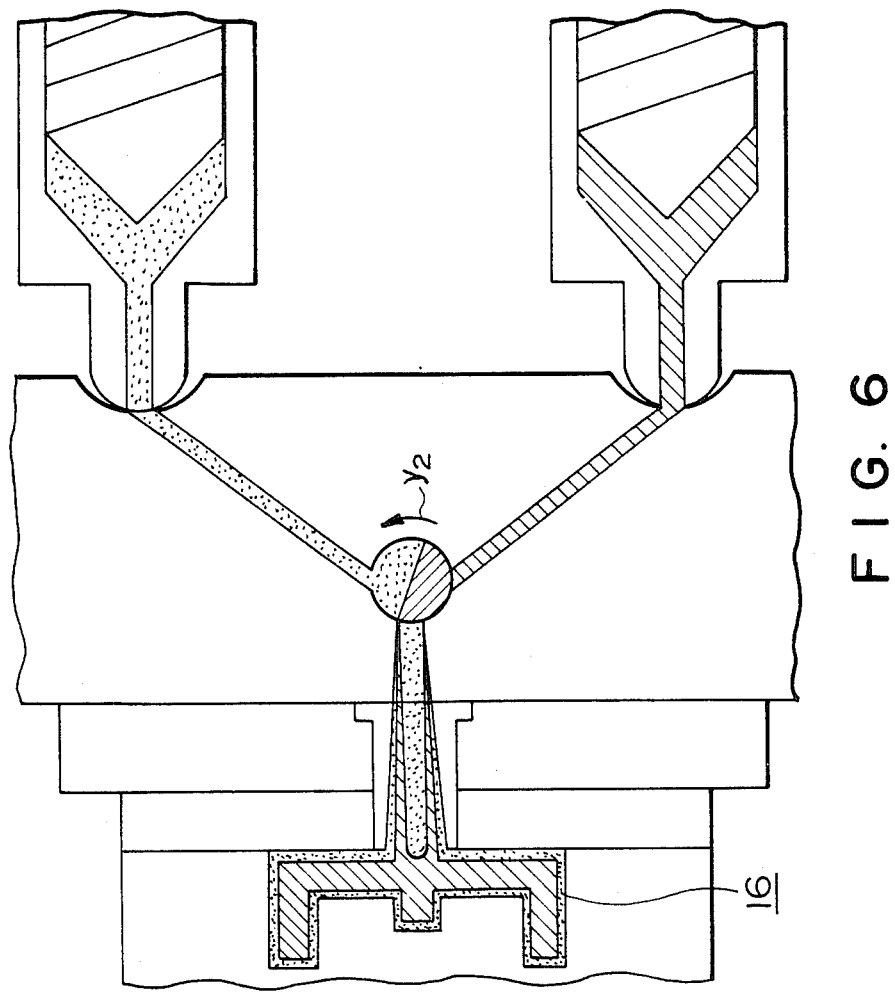

When the step of FIG. 5 is terminated, the valve 12 is further rotated in the direction of arrow $x_2$. This rotation stops at a position whereat, as shown in FIG. 6, the cylindrical portion of the valve 12 closes the sprue 2D of the valve holding member by the rotation of the valve 12 in the direction of arrow $x_2$. During this rotation, the skin layer resin A in the sprue 2D is cut by the cutting edge $12a_2$ at the end of the cut-away portion 12A of the valve. The sandwich molding process is completed by the above-described steps of FIGS. 1 to 6, whereafter the mold 8 is cooled, and then the mold is opened and a molded article 16 is drawn out, whereby the molding work is terminated.

After the molded article 16 has been drawn out of the mold, the mold is again closed and the valve 12 is rotated in the direction of arrow $y_2$. When the valve 12 is returned to the position of FIG. 3, the skin layer resin A is poured into the molding space 8A of the mold as previously described, whereafter the steps of FIGS. 4 to 6 are repeated, whereby sandwich molding is again effected.

Figure 7:
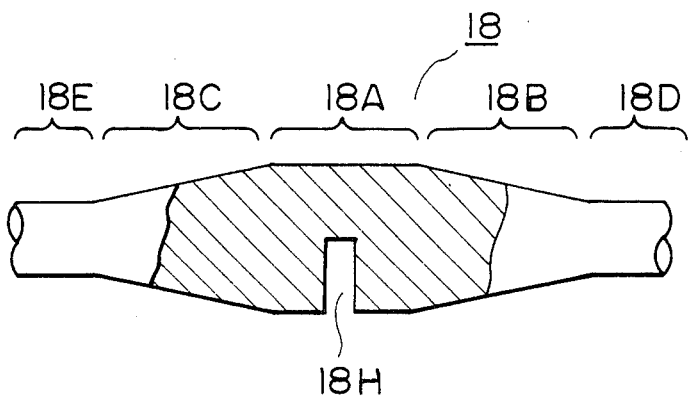
FIG. 7 is a fragmentary cross-sectional view of an improved valve according to the present invention.
Figure 8:
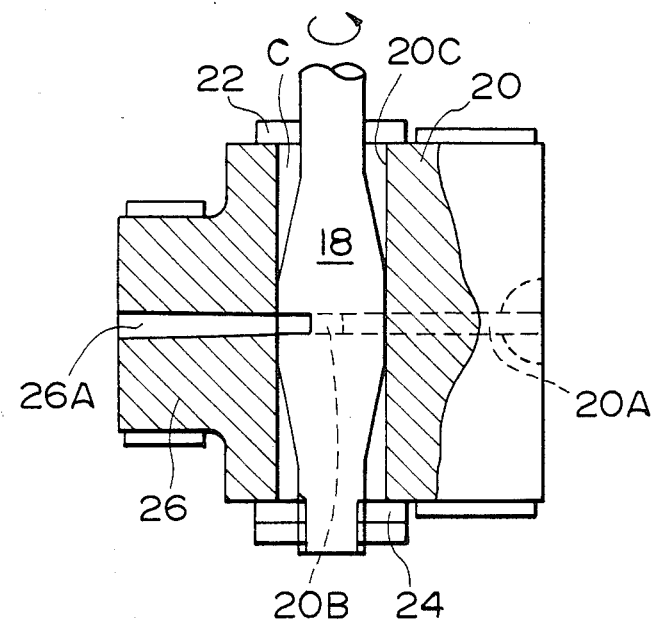
FIG. 8 shows the construction of a valve holding member using, the valve of FIG. 7.

FIGS. 7 to 9 show an improved form of the valve mechanism according to the present invention. Where the sandwich molding machine of the embodiment shown in FIGS. 1 to 6 is used for the production of the parts of mass production products, for example, the helicoid cylinders or the like of lens barrels, the steps described above in connection with FIGS. 1 to 6 are carried out continuously and at a high speed. In such case, part of molten resin material may sometimes leak into the gap between the valve 12 and the valve holding member 2.

This leaking resin damaged the outer peripheral surface of the valve 12 and the inner peripheral surface of the hole 2C of the valve holding member 2, harmed the accuracy of the valve mechanism itself and thus adversely affected the molded article.

The valve 18 shown in FIG. 7 and so on is an improvement which takes the countermeasure for the above-mentioned leaking resin into consideration. In FIG. 7, the valve 18 has a central cylindrical portion 18A and has frusto-conical tapered portions 18B and 18C at the opposite ends of the central cylindrical portion 18A, the end portions of the tapered portions comprising cylindrical holding portions 18D and 18E holding the valve 18 on the valve holding member. Designated by 18H is a cut-away portion provided at the center of said cylindrical portion 18A. FIG. 8 shows a cross-section of the essential portions of the valve 18 of FIG. 7 incorporated in the valve holding member 20. In FIG. 8, the valve holding member 20 holds the valve 18. Reference numerals 22 and 24 designate bearings which support the cylindrical holding portions 18D and 18E of the valve. The structure of the valve holding member 20 is similar to that of the above-described embodiment of FIG. 1, and two passageways 20A and 20B are connected to the inlets of first and second injection cylinders, not shown.

Reference numeral 26 denotes a sprue bush provided with a sprue 26A connected to the molding space of the mold, not shown. In the construction of the valve 18 and valve holding member 20 of FIG. 8, gaps C are provided between the tapered portions 18B, 18C and cylindrical holding portions 18D, 18E of the valve 18 and the hole 20C of the valve holding member into which the valve is fitted.

The valve mechanism of the embodiment shown in FIGS. 7 and 8 recovers the leaking resin from the valve with the aid of said gaps C, and this will hereinafter be described with reference to FIGS. 9A-D. In FIGS. 9A-D when the resin having entered from the cut-away portion 18F of the valve 18 into the minutes gap between the valve and the valve holding member progressively increases and the leaking resin P enters the gap C as shown in FIG. 9B, the resin is sheared at the upper part 18B, of the tapered portion by rotation of the valve 18 as shown in FIG. 9C, and a lump of sheared resin flows along the tapered portion 18B (18C) of the valve and is discharged outwardly via unshown discharge grooves formed in the cylindrical holding portions 18D and 18E of the valve.

As shown in the previously described embodiment, the present invention is provided with a valve mechanism in which the valve 12 provided with the semicircular cutaway portion 12A at the central position thereof is reciprocally rotatably fitted in the hole 2C of the valve holding member 2 and the cut-away portion 12A is connected to the discrete passageway 2A and 2B provided in the valve holding member.

According to the present invention, the skin layer resin A and the core layer resin B are designed to pass through the same cut-away portion 12A and therefore, the valve 12 can be formed into a simple shape and thus a study structure, and the trouble of the apparatus is not caused even by high-temperture and high-pressure injection molding work, and the connection between the passageways 2A, 2B and the sprue 2D can be accomplished by the single cut-away portion 12A and thus, the accuracy of parts involved in the opening-closing of the passageways can be greatly alleviated as compared with the conventional apparatus.

As described above, according to the present invention, a single cut-away portion is provided in the valve of the type in which two kinds of resin materials are poured into the molding space of the mold via a single sprue, and the opening-closing of the passageways of the first and second injection cylinder units is controlled by reciprocal rotation of the valve, whereby sandwich molding is accomplished. The hole through which the two kinds of resin materials pass is provided by the single cut-away portion, whereby the structure of the valve can be made simple and thus, the valve can be made simple and thus, the valve and the valve holding member can be made sturdy, and the accuracy of the valve and the valve holding member can be kept even during high temperature and high-pressure sandwich molding work. Further, according to the present invention, frusto-conical portions 18B and 18C are provided in the valve 18 and gaps C for eliminating the leaking resin are provided between the valve and the valve holding member, whereby the leaking resin can be removed while being sheared and thus, the adverse effect of the leakage of the resin can be eliminated.

Further, the present invention has an advantage that temperature control of the two kinds of resin materials different in injection temperature can be accomplished easily. In the valve mechanism shown in the aforementioned Japanese Patent Publication No. 28464/1975, two holes for discrete resins are provided in a valve and it is difficult to individually control the ambient temperatures of the holes of the valve to a skin layer resin temperature $T_1$ and a core layer resin temperature $T_2$. Thus, decomposition or solidification of the resin materials is caused when the temperature of the valve is adjusted to one of $T_1$ and $T_2$.

According to the present invention, for example, the temperature of the valve is set to the injection temperature of one of the skin layer resin and the core layer resin which is lower in melting point.

Reference is now had to FIG. 10 to describe the process of flowing the core layer resin B into the cut-away portion of the valve by the injection pressure during the step of FIG. 4 in which the valve 12 rotates in the direciton of arrow $y_1$ to pour the core layer resin B after the skin layer resin pouring step of FIG. 3. First, at the point of time whereat the skin layer resin pouring step of FIG. 3 has been terminated, the cut-away portion 12A of the valve is filled with the skin layer resin material A. Next, when the core layer resin material B is poured in from the second injection cylinder unit as shown in FIG. 10, the core layer resin material B passes through the skin layer resin material A at first and travels toward the sprue 2D. As the amount of core layer resin material B poured in gradually increases, the cut-away portion of the valve is filled with the core layer resin material B as shown in FIG. 4. In the step of FIG. 10, in the case of the present invention, the distribution port of the valve is the single cut-away portion 12A and the core layer resin B is poured in through the skin layer resin and therefore, the core layer resin B does not contact the surfaces of the valve 12 and the valve holding member 2. Therefore, the core layer resin B can be poured into the molding space of the mold through the cut-away portion of the valve without being affected by the temperatures of the valve and the valve holding member.

What I claim is:

1. An injection molding machine, comprising:
   a valve holding member provided with a first passageway for introducing a first resin material from a first injection cylinder and a second passageway for introducing a second resin material from a second injection cylinder;
   a valve rotatably held in a mating hole provided in said valve holding member, said valve assuming a substantially cylindrical shape and provided with a cut-away portion at the axially central position thereof;
   a mold having a space for molding an article into which said resin materials are poured; and
   a member having a pouring gate for pouring said first and second resin materials into said space;
   said valve being constructed such that it is stopped at a first position and a second position by the rotational movement thereof, that in said first position, it pours the first resin material from said first injection cylinder into said space of said mold through said first passageway, said cut-away portion and said pouring gate, and that in said second position, it pours the second resin material from said second injection cylinder into said space of said mold through said second passageway, said cut-away portion and said pouring gate, wherein the central portion of said valve is of a cylindrical shape, the opposite ends of said cylindrical shape assume a frusto-conical shape, and gaps for shearing leaked resin are provided between the frusto-conical portions of said valve and the inner surface of said mating hole of said valve holding member.

2. An injection molding machine according to claim 1, wherein said cut-away portion is formed by cutting the center portion of said cylindrically shaped valve so that the center portion has a substantially semi-circular shape and a cutter is provided in the cutting edge portion of said center portion.

* * * * *